United States Patent [19]
Le Floch

[11] 3,831,108
[45] Aug. 20, 1974

[54] METHOD OF FREQUENCY AND INTENSITY STABILIZATION OF THE RADIATION EMITTED BY A HIGH-POWER GAS LASER AND A GAS LASER FOR THE APPLICATION OF SAID METHOD

[75] Inventor: Albert Le Floch, Rennes, France

[73] Assignee: Agence Nationale de Valorisation de la Recherche Anvar, Neuilly sur Seine, France

[22] Filed: Apr. 10, 1973

[21] Appl. No.: 349,867

[30] Foreign Application Priority Data
Apr. 21, 1972 France .............................. 72.14213

[52] U.S. Cl. ............................................. 331/94.5
[51] Int. Cl. .............................................. H01s 3/10
[58] Field of Search ................................... 331/94.5

[56] References Cited
UNITED STATES PATENTS
3,649,930  3/1972  Le Floch ........................... 331/94.5
3,668,547  6/1972  Bodlaj ............................... 331/94.5

Primary Examiner—William L. Sikes
Attorney, Agent, or Firm—Cameron, Kerkam, Sutton, Stowell & Stowell

[57] ABSTRACT

The method consists in selecting a longitudinal mode having a frequency deviation $\delta$ from the center of the amplification line of the active gaseous medium, in applying a steady axial magnetic field within the gaseous medium so as to cause splitting of the amplification line by Zeeman effect, in superimposing an alternating axial magnetic field on the steady magnetic field so as to modulate the position of the magnetic Lamb dip and the output luminous intensity of the laser, in detecting and comparing the variations in output intensity with those of the alternating magnetic field, in generating a signal for correcting the frequency of the luminous emission and holding the frequency of the selected mode at the center of one of the two split lines.

24 Claims, 7 Drawing Figures

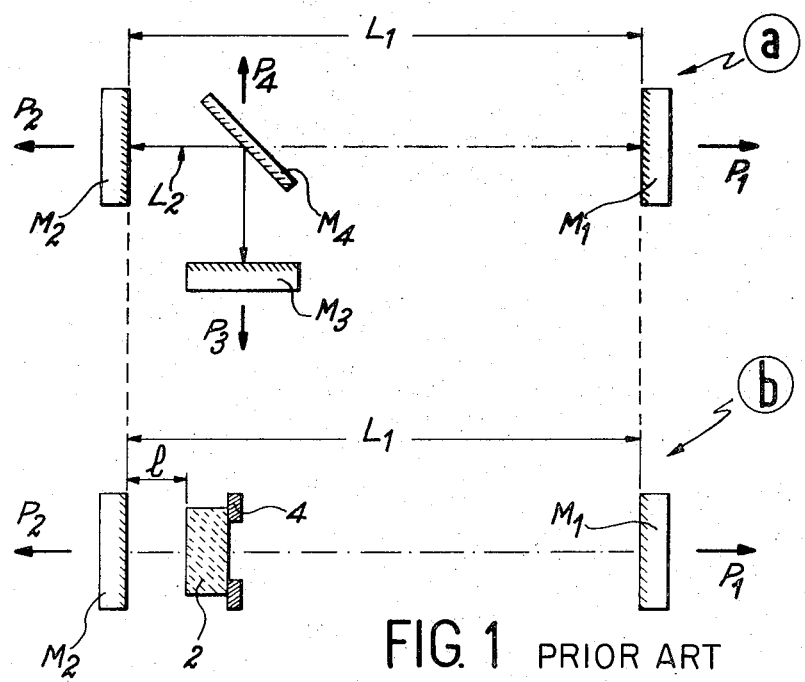
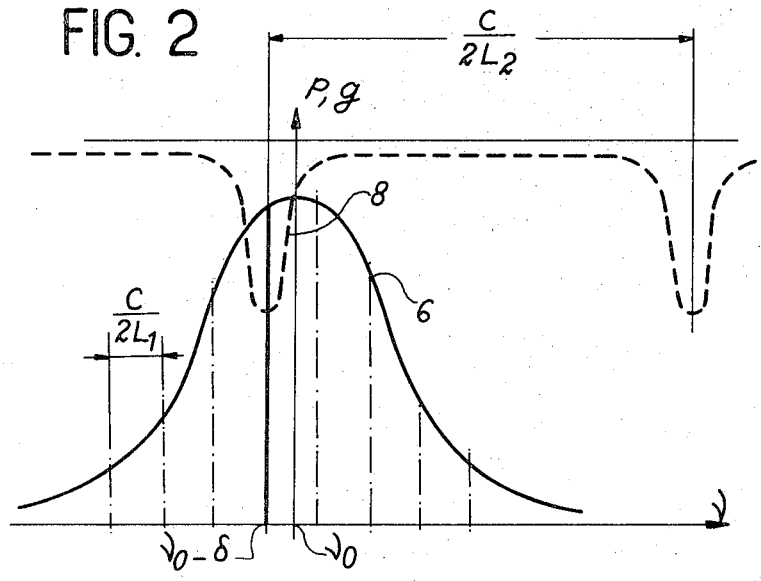

METHOD OF FREQUENCY AND INTENSITY STABILIZATION OF THE RADIATION EMITTED BY A HIGH-POWER GAS LASER AND A GAS LASER FOR THE APPLICATION OF SAID METHOD

This invention relates to a method for frequency-stabilization and intensity-stabilization of the radiation emitted by a high-power gas laser and to a laser for carrying out said method.

Many laser applications such as holography, metrology or the study of Brillouin and Raman scattering call for high luminous intensity and very high monochromaticity. The first of these characteristics is obtained by employing lasers of substantial length which produce high power and the second of these characteristics is obtained by making use of mode-selecting devices which may be associated if necessary with frequency-stabilizing means.

There are several known methods of achieving single-frequency (or single-mode) laser oscillation, that is to say of selecting only one mode from all the possible modes of oscillation. The oldest and most simple method consists in employing a laser which is sufficiently short to ensure that the difference in frequency between two successive longitudinal modes is comparable with the Doppler width of the line employed. A single longitudinal mode is then capable of oscillating and the laser is of single-frequency design. As an inevitable result, a laser of this type has low output power which can be of the order of 0.1 mW at 6328 A, for example, in the case of a gas laser of the helium-neon type. Another solution consists in making use of a long laser in which the frequency difference between two successive longitudinal modes is considerably smaller than the Doppler width and which is therefore capable of oscillating in a plurality of modes; a mode-selecting device is accordingly associated with this laser so that only one mode may be selected from all the modes which are capable of oscillating. A number of mode selectors are known and in particular the selector which makes use of the so-called Fox-Smith three-mirror interferometer, a description of which can be found in the article by P.W. Smith published in the I.E.E.E. Journal of Quantum Electronics, volume QE 2, No. 9, Sept. 1966, page 666. This interferometer is composed of three mirrors which define two cavities, namely a main long cavity in which the amplifying medium is placed and a short cavity which defines the position of the oscillation frequency. This method of spectral selection makes it possible to obtain a single-frequency laser which provides a high power, for example of the order of 50 mW in the case of a helium-neon gas laser on the line at 6328 A. Another method consists in placing within the resonant cavity of the laser a Fabry-Perot etalon which is substantially perpendicular to the axis of the laser. When said etalon is judiciously positioned with respect to the main cavity of the laser, it selects only one of the longitudinal modes which are capable of oscillating and thus produces a single-frequency laser output. The etalon serves to obtain laser emission powers which are substantially equivalent to the aforementioned method of spectral selection. By way of example, a description of this method can be found in the article by J.D. Currie entitled "High Power, single-mode helium-neon laser" which was published in Applied Optics, volume 8, No 5, May 1969.

While these methods and devices for spectral selection do in fact permit the obtainment of high-power single-frequency lasers, they nevertheless increase the complexity of the resonator to an appreciable extent and this gives rise to substantial variations in both frequency and intensity of the output radiation. The methods which have been proposed up to the present time for reducing these variations consist in increasing the stability of the passive cavity which determines the oscillation frequency. However, any drift (of thermal or mechanical origin) of the reference cavity has a consequential effect on the emission frequency of the laser radiation. Furthermore, in devices of this type, the frequency is determined with respect to a reference of mechanical nature but this is unsuitable for the study of atomic phenomena in many applications.

A number of methods and devices are known for frequency-stabilizing the radiation emitted by a gas laser on an atomic reference and not on a mechanical reference.

When the laser to be frequency-stabilized is a short, single-mode laser, there exist in the prior art a number of methods of stabilization. The first method consists in utilizing the Zeeman effect which makes it possible as a result of application of a magnetic field to split certain amplification lines into two components which are circularly polarized to the left and to the right and to compare the intensities of these two components. When the oscillation frequency of the laser occupies a position corresponding to the center of the unsplit line, the two left and right components oscillate with the same intensity. In any other position, the two components have different intensities, thus constituting a discriminant for holding the oscillation frequency at the center of the line. In an alternative form of this method, an absorption line can be split as a result of the same effect and the absorptions due to the left and right components are compared. In order to illustrate these methods of the prior art, mention can thus be made of the frequency-stabilized single-mode short laser of T.G. Polanyi and I. Tobias described in U.S. Pat. No. 3,153,557 of July 1st, 1969.

Although these known methods and devices for frequency stabilization in fact make it possible to obtain a laser having good spectral qualities, they nevertheless have a disadvantage in that the laser frequency can be stabilized only at the center of the amplification line of the gas employed.

Another known method consists in frequency-modulating the oscillation mode of the laser and in studying the modulation of the output intensity. In fact, the characteristics (phase and amplitude) of the laser intensity modulation depend on the position of the resonance mode with respect to the central frequency of the amplification line. Frequency modulation is usually carried out by producing a very slight vibration of one of the mirrors which form the cavity, thereby achieving a very slight displacement of the optical frequency of the laser oscillation. One of the oldest devices in which this method is used was described by W.R.C. Rowley and D.C. Wilson in "Nature," No. 4,908, Nov. 23rd, 1963 in an article entitled "Wavelength stabilization of an Optical Maser." In the case of this device, the oscillation frequency is held at the vertex of the amplification curve. This method is inaccurate, partly on account of the flatness exhibited by a Gaussian curve of the type representing the amplification profile which is characteristic of gas lasers. It is in fact difficult to localize the vertex of a Gaussian curve which is in any case flatter than the curve predicted by theory for reasons of saturation of the emission intensity in the vicinity of the peak value.

A more precise method has since been developed and this consists in utilizing the so-called "Lamb dip" phenomenon. The theory of this phenomenon was studied by W.E. Lamb in the "Physical Review," 134, No 6A, 1964, p. 1429, and relates to the appearance of a hole at the vertex of the intensity curve. The existence of this hole, the origin of which is of non-linear nature, depends on the experimental conditions of operation of the laser, namely intensity, pressure and nature of the gases. The presence of the "Lamb dip" is turned to useful account for frequency stabilization of short, single-mode gas lasers by a method of holding the frequency at the center of this dip. This method is also carried out by frequency modulation and by comparison of the characteristics of this modulation with those of the output intensity of the laser which has thus been modulated. Compared with the Wilson method, this "Lamb dip" method of stabilization has the advantage of holding the frequency at the center of a profile which is narrower than that of the total amplification curve of the gaseous medium. In fact, it is known from the theory developed by Lamb that said dip has a Lorentzian shape, the width of which can be typically of the order of 100 Mc/s, whereas the total amplification curve of the gaseous medium is a Gaussian curve which is much flatter at the vertex and of substantially greater width which is typically of the order of 1,500 Mc/s.

These methods of frequency stabilization by modulation of the oscillation frequency are subject to the following disadvantages:

the emission frequency of the laser is necessarily stabilized at the center of the profile of the emission line of the medium employed;

the correction signal employed in the control of the oscillation frequency is obtained by producing a slight oscillation of the resonant frequency of the laser cavity in order to scan the "Lamb dip." In practice, steps are taken to ensure that the modulation, which is chosen so as to be as small as possible, is compatible with the value of the ratio of correction signal to noise. The intensity of the correction signal which is a function of the amplitude of scanning across the "Lamb dip" is therefore limited;

if the emission frequency of the laser is well controlled within a given range, it is nevertheless subject to variation by reason of the basic principle of the method which results in uncertainty in regard to the instantaneous value of the frequency;

finally, these frequency-stabilization methods may be considered acceptable for short single-mode lasers in spite of the disadvantages referred-to above but cannot be extended to long lasers which are caused to oscillate at a single frequency by making use of a mode selector, as will be more readily understood from the following description of the present invention.

Apart from these methods of frequency stabilization, there is another known method which consists in utilizing a so-called "magnetic Lamb dip" phenomenon and which has been studied by the present Applicant. Reference can be made, for example, to U.S. Pat. No. 3,649,930 and to the publication by A. Le Floch et al. in "Applied Physics Letters" Vol. 17, No 1, pages 40–42, July 1st, 1970 and entitled "Frequency stabilization of a gas laser using the magnetic Lamb dip." There can be found in these documents the principle of the "magnetic Lamb dip" and of its use in the frequency stabilization of the emission of a short single-frequency gas laser. This method consists in producing by means of a steady magnetic field a "magnetic Lamb dip" in one of the two Zeeman components and in holding the frequency of the single oscillation mode at the center of said "magnetic Lamb dip." This frequency control is carried out by producing a slight modulation of the steady magnetic field as obtained in practice by superimposing a small alternating component on this latter, thereby modulating the position of the "magnetic Lamb dip" without changing the oscillation frequency of the laser. This modulation of the position of the "magnetic Lamb dip" causes a modulation of the intensity emitted by the laser; a comparison between these two modulations makes it possible to form a discriminant which is employed for stabilizing the oscillation frequency at the center of the "magnetic Lamb dip."

Theoretical studies and the experience of the present Applicant have shown that the use of the "magnetic Lamb dip" permits on the one hand the frequency-stabilization of the emission of a long laser which has previously been set for single-frequency oscillation by means of one of the known methods of spectral selection and, on the other hand, the intensity-stabilization of said emission. The object of the present invention is therefore to stabilize both in frequency and in intensity the radiation emitted by a gas laser which is no longer necessarily a short laser as in the prior art but which can on the contrary be a long and therefore a high-power laser.

More precisely, the present invention relates to a method of frequency-stabilization of the radiation emitted by a high-power gas laser, characterized in that:

a mode selector is operated so as to select from all the longitudinal modes which are capable of oscillating only one of these modes which exhibits a frequency deviation $\delta$ from the center of the amplification line of the gaseous medium;

a first steady axial magnetic field is applied within the gaseous medium so as to cause splitting of the amplification line by Zeeman effect, the centers of each split line being located at a frequency $\Delta\nu$ from the center of the line in a zero field;

a second alternating axial magnetic field is applied and superimposed on said first steady magnetic field, which leaves the resonant frequencies at fixed values but modulates the position of the "magnetic Lamb dip" and consequently the output luminous intensity of said laser;

said modulated output intensity is detected;

the variations in said output intensity are compared with those of said second alternating magnetic field;

a correction signal is generated;

the frequency of the luminous emission of said laser is corrected by means of said correction signal in order to achieve the equality $\delta = \Delta\nu$, thereby holding the frequency of the selected mode at the center of one of the two split lines.

In an alternative embodiment of the method, the intensity of the radiation emitted by the laser is also stabilized by producing action on the mode selector.

A further object of this invention is to provide a gas laser which carries out said method and comprises an active gaseous medium contained in an envelope and located between a first and a second mirror forming a resonant cavity having a length $L_1$, means for exciting said gaseous medium so as to produce a population inversion, characterised in that it additionally comprises:

a longitudinal mode selector which permits oscillation of only one longitudinal mode;

means for producing in said active gaseous medium an adjustable steady axial magnetic field;

first means for holding the frequency of the selected mode at the center of one of the two magnetic Lamb dips constituted by a first control loop comprising means for producing in said active medium an adjustable alternating axial magnetic field, a first detector for the luminous intensity emitted by said laser, a first comparator for comparing the variations of said output intensity with those of said alternating magnetic field, said comparator being intended to generate a correction signal which produces action on means for varying the length $L_1$ of said resonant cavity.

In an alternative embodiment, the intensity of the laser radiation is also stabilized and the laser further comprises second control means for producing action on said longitudinal mode selector, the time constant of said second means being longer than that of said first control means.

A better understanding of the invention will be gained from the following description of examples of construction which are given by way of explanation and not in any sense by way of limitation, reference being made to the accompanying drawings, wherein:

FIG. 1 represents two mode selectors, one of which utilizes a Fox-Smith interferometer (as shown in FIG. 3a) whilst the other makes use of a Fabry-Perot etalon (as shown in FIG. 3b);

FIG. 2 illustrates the principle of selection of one of the modes of a family of longitudinal modes with an interferometer of the Fox-Smith type as shown in FIG. 1a;

Figure 3:
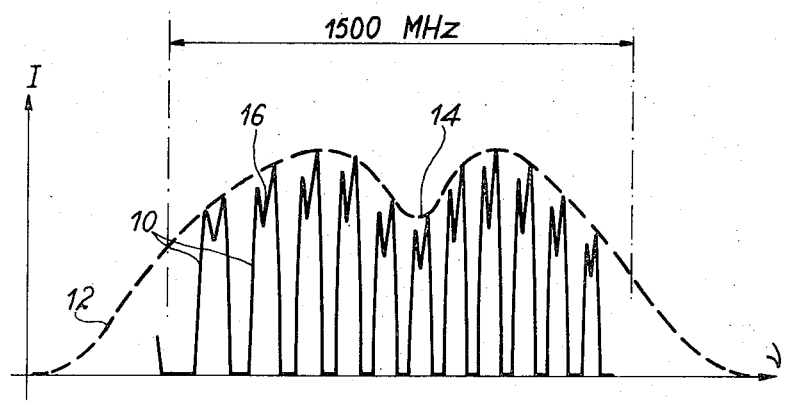
FIG. 3 represents the variations in luminous intensity emitted by the laser in a zero magnetic field when the length of the mode selector is varied.

In accordance with the invention, use is made of a long gas laser which is capable of oscillating in a large number of longitudinal modes, there being carried out simultaneously a spectral selection from all these modes and a control of the frequency of the selected mode. It is therefore possible to study first of all the principle of the spectral selection which is employed by the invention. This spectral selection entails the use of the known methods which were mentioned above in connection with the prior art and which utilize, for example, an interferometer of the Fox-Smith type (FIG. 1a) or a FabryPerot etalon (as shown in FIG. 1b). However, the invention is not limited to these two devices. Since these known methods of spectral selection exclude the majority of frequency-stabilization devices of the prior art, it may prove useful in order to gain an understanding of the advantages provided by the invention to explain at the outset the principle of this spectral selection and to show that the frequency stabilization proposed by the invention is applicable to lasers which are provided with selection devices of this type.

In FIG. 1a, there is shown a Fox-Smith interferometer as described, for example, in the article by P.W. Smith which was mentioned in the foregoing. In this figure, the main cavity is formed by the two mirrors $M_1$ and $M_2$; this cavity has a length $L_1$; a second cavity which is much shorter and has a length $L_2$ is formed by the mirror $M_2$ and a mirror $M_3$ which is located outside the preceding cavity. The resonant cavity having a length $L_1$ and the small resonator having a length $L_2$ are coupled by means of a beam separator $M_4$ which can in practice be a semi-transparent mirror. When a suitably excited amplifying medium is placed within the resonant cavity which is consituted by the two mirrors $M_1$ and $M_2$, the radiation which emerges from said interferometer is composed of four partial beams designated respectively by $P_1$, $P_2$, $P_3$, $P_4$, the intensities of which depend on the coefficients of reflection of the different mirrors employed.

In FIG. 1b, there is shown a resonant cavity having a length $L_1$ which is formed by the mirrors $M_1$ and $M_2$ and within which is placed a Fabry-Perot etalon 2 mounted on a support 4, said etalon being substantially perpendicular to the axis of the resonant cavity having a length $L_1$; said etalon defines with the mirror $M_2$ a resonant cavity having a length $1 \ll L_1$. The etalon also constitutes with the mirror $M_1$ another cavity having a length substantially equal to $L_1$. Spectral selection is obtained as a result of the presence of these multiple cavities which are coupled together, thereby defining coincidences of resonant frequency which make it possible to select a mode.

Although the invention is not limited solely to the use of one of these two spectral selection devices, the description will be given by way of explanation on the assumption that the long laser of the invention is set for single-frequency oscillation by making use of a Fox-Smith interferometer as shown in FIG. 1a.

The principle of selection of a mode from a family of longitudinal modes is illustrated in FIG. 2. In this figure, there has been plotted as abscissae the frequency $\nu$ and as ordinates the losses p of the total resonator of the laser and the gain g of the amplifying medium. The center of the line is indicated by the frequency $\nu_0$. The plurality of vertical lines represents diagrammatically the longitudinal modes of the resonant cavity of length $L_1$ which are capable of oscillating without a mode-selecting device. The curve 6 is the Doppler profile of the amplification line of the gaseous medium and the curve 8 represents the losses caused by the resonator consisting of the mirrors $M_2$ and $M_3$ of length $L_2$ which is considerably smaller than $L_1$; the long cavity of length $L_1$ contains the amplifying medium and constitutes the active cavity. The short cavity of length $L_2$ is passive and makes it possible to select one of the modes of the cavity $L_1$. Looking from the amplifying medium, the resonator constituted by $M_2$, $M_3$ and $M_4$ behaves as a mirror having a reflecting power as a function of the frequency which is identical with the transmission of a Fabry-Perot etalon having the same length. The losses caused by said resonator vary periodically as a function of the frequency $\nu$ along the curve 8 in which the interval between two troughs is equal to $c/2L_2$. The interval between the modes of resonance of the cavity having a length $L_1$ is $c/2L_1$ which is considerably smaller than $c/2L_2$. When a mode of resonance of the cavity of length $L_1$ coincides with a trough of the losses caused by the resonator of length $L_2$, the situation is as shown in FIG. 2 in which it is apparent that, in the case of the frequency $\nu_0 - \delta$, the gain represented by the curve 6 is predominant over the losses represented by the curve 8; in the case of any other mode of resonance, the gain of the amplifying medium is smaller than the losses and oscillation is impossible. In consequence, this device in fact achieves spectral selection insofar as it selects only one mode from all the modes which are capable of oscillating provided that the interval $c/2L_2$ is greater than the width of the curve 6.

The frequency and the intensity of the selected mode depend on the lengths $L_1$ and $L_2$. Let it be assumed that the interferometer of the figure 1a is so designed that the lengths $L_1$ and $L_2$ are separately variable, which can be obtained by coupling the mirrors $M_1$ and $M_3$ of piezoelectric supports which are capable of translating said mirrors in a direction parallel to themselves. In the case of a given length $L_1$, when the length $L_2$ is caused to vary by displacing the mirror $M_3$, for example, the trough which is represented in the profile 8 moves across the profile 6, thereby resulting in variations in the intensity emitted by the laser in dependence on the coincidences with the modes of resonance of the cavity having a length $L_1$. This condition is illustrated in FIG. 3.

In this figure, there has been plotted as abscissae the frequency $\nu$ of the radiation emitted by the laser and as ordinates the intensity I of said emission when the length $L_2$ of the mode selector is caused to vary. The modification of $L_2$ causes simultaneously a variation in the emission frequency and a variation in intensity in accordance with the lobes 10. The envelope 12 of said lobes is none other than the profile of amplification of the line employed which is widened by Doppler effect. In the case of FIG. 3, the gaseous mixture employed was a mixture of helium and neon and the transition was that of neon at 6328 A. There is again shown in this figure the conventional Lamb dip 14 which is located at the center of the amplification line; the total width of the profile 12 is typically of the order of 1,500 Mc/s. If each lobe 10 is examined, it is found that there exists at the top of each lobe a hollow portion 16, the shape of which will be seen more readily from FIG. 4.

In FIG. 4a, there are shown the variations in the power $P_4$ which is delivered from the laser at right angles to the axis of the resonant cavity. There are shown in FIG. 4b the variations in the power $P_1$ which is detected in the axis of the laser. There is represented as abscissae the frequency $\nu$ which varies with the length $L_2$ of the modeselecting resonator at the time of displacement of the mirror $M_3$ with a scale of frequencies which is expanded with respect to that of FIG. 3. There are again shown in FIG. 4a the lobes 10 which are provided at the summits with hollows portions 16, the origin of which is as follows: when the position of the mirror $M_3$ is such that the coefficient of reflection of the resonator formed by the mirrors $M_2$ and $M_3$ is of maximum value or in other words when the losses introduced by said resonator are of minimum value, the trough of the curve 8 of FIG. 2 is centered with respect to the selected mode of oscillation; the power within the laser is then of maximum value, which corresponds to a maximum power $P_1$ extracted along the axis of the laser; this is represented in FIG. 4b by the curve 18; the correspondence between the summit of the curve 18 and the bottom of the hollow portion 16 is clearly observed; when the mirror $M_3$ moves, the reflecting power of the passive arm of the interferometer decreases, which has the effect of reducing the power within the interior of the laser but results in a slight rise in the power $P_4$ since the reflecting power comes closer to the optimum reflecting power corresponding to a better extraction of the power which is stored within the laser; a summit 20 is thus attained on the curve of variations of $P_4$ and corresponds to a point 22 which is located on the side of the curve 18. If the mirror $M_3$ continues its displacement, the reflecting power of the passive resonator continues to decrease, thereby causing a drop in the intensity $P_4$ until the losses become excessive and oscillation of the laser stops. The intensities $P_1$ and $P_4$ therefore fall to zero at the same time and in respect of the same frequency. It can be noted that the power $P_1$ which is extracted in the axis of the laser is proportional to the power $P_2$, the same result being accordingly achieved by representing on FIG. 4b the variations either of the power $P_1$ or the power $P_2$. Since the mirrors $M_1$, $M_2$ and $M_3$ usually have very high coefficients of reflection in the vicinity of 1, the powers $P_1$, $P_2$ and $P_3$ are usually low, with the result that the useful power of the laser is the power $P_4$.

Figure 4:
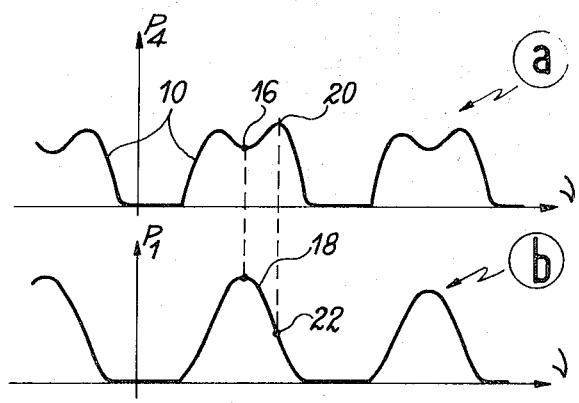
FIG. 4 represents the variations in power detected respectively in the axis and perpendicularly to the axis of the laser when the length of the mode selector is caused to vary.

The experimental results of FIGS. 3 and 4 obtained by the present Applicant are in accordance with those previously obtained by P.W. Smith and described in the reference which has already been cited. However, a description of these results will lead to a clearer understanding of the method according to the invention which consists in stabilizing the intensity of the laser radiation by making use of the correspondence between the curves 10 and 18 as will become apparent from the following description.

This review of one of the possible methods for carrying out a spectral selection serves to gain a clearer understanding of the reason why the methods of frequency stabilization in accordance with the prior art are inoperative with methods of selection of this type. In fact, if reference is made to FIG. 3, it is observed that the position of the conventional Lamb dip 14 does not necessarily coincide with one of the lobes 10, with the result that any method which utilizes the presence of the conventional Lamb dip and in particular the method which consists in modulating the frequency of the laser in the vicinity of the bottom of said Lamb dip is inapplicable in this case. On the contrary, in accordance with the invention, the "magnetic Lamb dip" phenomenon as previously brought out by the present Applicant is employed and is well adapted to long lasers fitted with a mode-selecting device.

Figure 5:
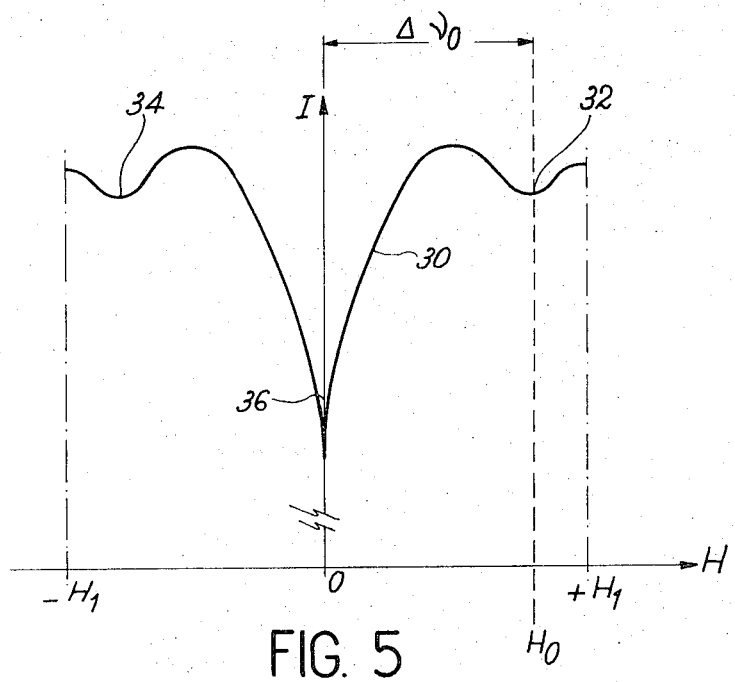
FIG. 5 represents the variations in luminous intensity emitted by the laser as a function of the applied steady magnetic field in respect of a given frequency deviation $\delta$ of the selected mode with respect to the center of the amplification line.

FIG. 5 illustrates this "magnetic Lamb dip" phenomenon. The figure represents the variations in luminous intensity I emitted by a laser as a function of the steady magnetic field H applied to the amplifying medium of said laser in respect of a given fixed frequency of the selected mode indicated by the deviation $\delta$ with respect to the center $\nu_o$ of the amplification line. It is known that the application of an axial magnetic field splits up certain amplification lines of the gaseous medium and in particular the line at 6328 A of the helium-neon laser into two circularly polarized Zeeman components, one located on the right and the other located on the left. These components are displaced with respect to the center of the line in a zero field by a quantity $\Delta\nu$ which is proportional to the intensity H of the steady magnetic field. Let it therefore be assumed that the Fox-Smith interferometer is adjusted so that only one mode of oscillation is present at a frequency $\delta$ from the center of the line. When $\delta$ is fixed and the amplitude H of the applied steady magnetic field varies, there are observed variations in the intensity I of the laser such as those represented by the curve 30 of FIG. 5. In this figure, the intensity H which appears as abscissae varies from $-H_1$ to $+H_1$ and the intensity I emitted by the laser is represented as ordinates. This curve has two hollow portions 32 and 34 corresponding to the magnetic Lamb dip of one of the Zeeman components (defined by the sign of $\delta$ — consideration can in any case be given only to one-half of this curve, for example from O to H) and a hollow portion 36 in a zero field. These hollow portions which the present Applicant designates are resonances result from non-linear phenomena; however, only the hollow portions 32 and 34 constitute true magnetic Lamb dips — related to the stationary character of the waves located at these frequencies — whereas the resonance 36 in a zero field does not constitute a true Lamb dip since it is due to the travelling-type waves. As a result of the theoretical and experimental researches of the present Applicant, the resonance 32 (or the resonance 34) appears when the condition $\delta = \Delta\nu_o$ is satisfied, that is to say when the selected mode coincides with the summit of the Zeeman component. This resonance condition can be fulfilled either by maintaining $\delta$ at a fixed value and by adjusting to $H_o$ the value of the intensity of the magnetic field which is the case of FIG. 5 or, conversely, by maintaining $\Delta\nu$ and therefore H at a fixed value and by displacing the frequency of the selected mode in order to bring it to the hollow portion of the magnetic Lamb dip.

It is noted from FIG. 5 that the magnetic Lamb dip is highly pronounced, which is very favorable to the use of this phenomenon in the stabilization of the emission frequency of the laser. If this phenomenon is very pronounced in the case of a high-power laser of the type employed in the present invention, this is due to the fact that its origin is related to non-linear effects, the magnitude of which is greater as the power emitted by the laser is higher. It can therefore be stated that the use of the magnetic Lamb dip for frequency stabilization of lasers is even better suited to long lasers than to single-mode short lasers in which the luminous intensity emitted is of a low order.

Having selected a mode of oscillation and produced a magnetic Lamb dip in accordance with the method which has just been described, the frequency of the laser emission is stabilized in accordance with the invention as in U.S. Pat. No. 3,649,930 filed by the present Applicant and already referred-to. To this end, there is superimposed on the steady magnetic field of intensity $H_o$ corresponding to a deviation $\Delta\nu_o$ a small alternating component $H_1 \cos \omega t$, which produces a modulation of the intensity emitted by the laser. The phase of this modulation changes sign when $\delta - \Delta\nu_o$ changes sign; in consequence, there is thus a discriminant which makes it possible to stabilize $\delta$ about $\Delta\nu_o$ or in other words finally to stabilize the oscillation frequency at the value $\nu_0 + \Delta\nu_o$. This value can naturally be adjusted by producing action on $\Delta\nu_o$, that is to say on Ho. Since the mangetic Lamb dip is highly pronounced, the signal-to-noise ratio is higher than that of the other methods which employ a conventional Lamp dip, for example; it is in any case possible to increase this signal-to-noise ratio by increasing the amplitude of the alternating magnetic-field component without thereby modifying the value of the resonant frequency of the oscillating mode which always remains fixed in accordance with the invention.

There will now be described a laser which is stabilized in frequency and may also be stabilized in intensity, the laser being intended to carry out the method which has just been described. The schematic diagram of a laser of this type is given in FIG. 6.

In this figure, there is shown a gas laser fitted with a mode selector of the Fox-Smith interferometer type but is is wholly apparent that the description could be readily transposed to a laser which would make use of a Fabry-Perot etalon of the type described in connection with FIG. 1b. In FIG. 6, there are again shown the mirrors $M_1$, $M_2$, $M_3$ and $M_4$ which constitute the interferometer for selecting an oscillating mode. The amplifying gaseous medium is contained in an envelope 40 and is excited by suitable means which are not shown in this figure and serve to produce a population inversion in the gaseous medium. The active gaseous medium is placed within the cavity of length $L_1$ which is defined by mirrors $M_1$ and $M_2$; the mirrors $M_1$ and $M_3$ are rigidly fixed to piezoelectric supports 42 and 44 which permit displacement of said mirrors under the action of voltages. Means for applying magnetic fields are constituted by a solenoid 46 supplied by a generator 48; said generator 48 is constituted on the one hand by a direct-current generator which produces within the active medium and via the winding 46 a steady magnetic field which is parallel to the axis of the amplifying medium and has an intensity $H_0$ and, on the other hand, by a generator which produces alternating current having an angular frequency $\omega$ and makes it possible to superimpose an alternating magnetic field $H_1 \cos \omega t$ on the steady field $H_0$. Two detectors 58 and 60 for detecting the luminous intensity emitted along the axis of the laser serve to measure the powers $P_1$ and $P_2$. As has been explained in the foregoing, the modulation produced by the alternating magnetic field $H_1 \cos \omega t$ produces a modulation of the intensity emitted by the laser and these two modulations are compared in the comparator 62; said comparator generates a correction signal which is amplified in the circuit 64 and applied to the piezoelectric support 42, said support being rigidly fixed to the mirror $M_1$ which determines the length $L_1$. The complete assembly of elements 60, 62, 64 and 42 therefore constitutes a first control loop for adjusting the length $L_1$ and consequently the oscillation frequency of the laser.

The luminous intensity detected by the element 58 is compared with a reference signal delivered by the circuit 66 in a comparator 68 which generates a correction signal, said signal being applied to the piezoelectric support 44 which determines the length $L_2$ of the mode-selecting passive resonator. The assembly which consists of the elements 58, 68, 66 and 44 therefore constitutes a second control loop for stabilizing the length $L_2$ and consequently the emission intensity of the laser. It is readily apparent that provision need not be made for said second control loop in certain alternative forms of construction.

Figure 6:
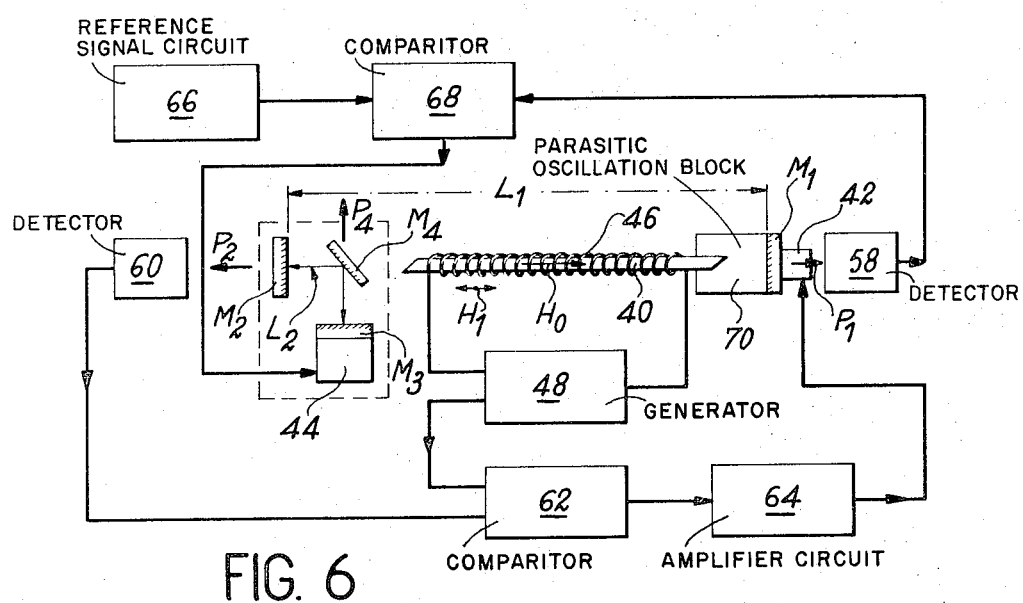
FIG. 6 is a schematic diagram of a frequency and intensity-stabilized gas laser in accordance with the invention.

In the case in which the gaseous medium is a mixture of helium and neon and in which the 6328 A transition is employed, the laser in accordance with the invention can further comprise an element 70 in which is intended to block possible oscillations other than that which occurs at a wavelength of 6328 A and in particular at a wavelength of 3.39 $\mu$. This element can be a tank containing methane, the absorption of which at 3.39 $\mu$ is known to be very considerable and sufficient to block this parasitic oscillation. This is shown in FIG. 6. But this element can also be a prism which is so oriented that the main cavity is correctly adjusted at 6328 A and out of adjustment at 3.39 $\mu$.

A better understanding of the principle of operation of the laser which is illustrated in FIG. 6 will be obtained by making reference to FIG. 4 in regard to intensity stabilization and to FIG. 5 in regard to frequency stabilization.

It will be assumed that the length $L_2$ of the passive resonator of the mode selector is such that the selected mode is displaced from the center of the amplification line in a zero field by a value $\delta$. There corresponds to the steady magnetic field $H_0$ a magnetic Lamb dip which is displaced by $\Delta\nu_o$ with respect to the center of the amplification profile. Depending on the sign of $\delta - \Delta\nu_o$, the relative phase of the intensity modulation of the laser with respect to the modulation of the magnetic field changes sign; the comparator 62 which is preferably a phase detector generates a correction signal which is amplified by the circuit 64 and applied to the piezoelectric support 42 so that the length $L_1$ should correspond to the equality $\delta = \Delta\nu_o$. There therefore corresponds to any length $L_2$ a length $L_1$ such that the oscillation frequency of the laser is at the center of the magnetic Lamb dip 32 (or 34) of FIG. 5. The position of this hollow portion can in any case be displaced at will by varying the amplitude $H_0$ of the steady magnetic field since $\Delta\nu$ is directly proportional to $H_0$.

By way of explanation which does not constitute any limitation of the invention, the following typical values of fields can be employed: $H_0$ of the order of a few hundred Gauss, (which corresponds to a deviation with respect to the center of a few hundred megacycles), $H_1$ of the order of 10 percent of $H_0$ and $\omega/2\pi$ of the order of a few thousand cycles. As has been recalled earlier, the signal-to-noise ratio can in any case be adjusted to a correct value by increasing $H_1$ without thereby destroying the frequency stability by reason of the fact that, in accordance with the invention, the mode of resonance is maintained fixed and the modulation affects only the position of the amplification curve. There is no need to describe the detectors 58 and 60 which can in particular be conventional photoelectric detectors; similarly, both the phase detector 62 and the direct-current amplifier 64 are well known to those versed in the art as conventional control-loop components.

The frequency of the radiation emitted by the laser having thus been stabilized by means of said first control loop, the intensity of said radiation may be stabilized if necessary by means of the second control loop which produces action on the length $L_2$. When the length $L_2$ varies, the useful power $P_4$ emitted by the laser varies according to curve 10 of FIG. 4a. It is apparent that, by directly measuring said power $P_4$, it would be possible to control this latter in dependence on any reference value by means of a conventional control system which produces action on the length $L_2$. On the other hand, the invention makes provision for a control system which utilizes the concomitant variations in the power $P_1$ as represented by the curve 18 of FIG. 4b. In fact, a comparison between the curves 10 and 18 shows, as has been explained earlier, that the maximum power $P_4$ (point 20 of the curve 10) is obtained in respect of a power $P_1$ represented by the point 22 which is located on the side of the curve 18 in which the variations of $P_1$ are very rapid, this being conducive to accurate control about said point 22. More precisely, instead of controlling the power $P_4$ by measuring this latter directly, the power $P_1$ is controlled in accordance with the invention about a reference value corresponding to the point 22, which indirectly controls the power $P_4$. To this end, the power $P_1$ is detected by means of the detector 58 and the signal delivered by said detector is compared in the circuit 68 with a reference signal delivered by the generator 66. If the detector 58 is of the photoelectric type, it is naturally convenient to make use of a reference signal of electrical type, in which case the comparator 68 is preferably a differential amplifier. The correction signal derived from the differential amplifier 68 then produces action on the mirror $M_3$ by means of the piezoelectric support 44 which is rigidly fixed thereto. This action results in a modification of the length $L_2$, with the result that the intensity $P_4$ is controlled about its maximum value which is represented by the point 20. This second loop for controlling the intensity of radiation emitted by the laser therefore corrects the slow variations resulting from drift of the passive cavity of the mode selector (drift of thermal type, mechanical type and so forth).

The time constants of the two frequency and intensity control loops must not be of any indeterminate value. In fact, if the time constants were closely related, the modulation of the laser intensity caused by the alternating component of the magnetic field could result in modification of the length $L_2$ by means of the second control loop, which would naturally impair the operation of the laser. It is therefore necessary to ensure that the intensity control loop has a much longer time constant than that of the frequency control loop, with the result that the intensity control loop can correct only slow drift inasmuch as the rapid modulation imposed by the principle of frequency stabilization can be utilized only by the first control loop which produces action on the length $L_1$. By way of indication, a time interval of the order of one second can be adopted as response time for the second control loop.

Although slow drifts of the passive resonator of the mode selector are corrected by the second control loop, it is desirable to ensure that said resonator is rigidly fixed to a support formed of a metal having a very low coefficient of expansion and especially of Invar. Similarly, in order to prevent any magnetostrictive effect which may result from the presence of an alternating magnetic-field component, the support can be isolated from the mode selector by means of a wall formed of material having high magnetic permeability and especially of Mumetal.

Although the method according to the invention can be adapted to any line of substances which are usually employed in gas lasers, the neon line at 6328 A plays a preferential part. This line is obtained under particular conditions of excitation which are well known to those versed in the art. In the practical application of the invention at a wavelength of 6328 A, preference is given to the use of the isotope 20 of neon which corresponds to a more pronounced magnetic Lamb dip that in the case of ordinary neon. In order to close the tube which contains the amplifying medium, preference is also given to the use of plates which are inclined at the Brewster angle and produce a high degree of anisotropy within the main resonator. Under these conditions, and taking into account the low gain exhibited by the line at 6328 A, the polarization of the electric field vector of the laser radiation remains practically linear despite the presence of the magnetic field. In the case of lines other than 6328 A (namely 3.39 $\mu$, for example), or in the case of cavities which do not have a high degree of anisotropy, the polarization need not remain linear under the action of the magnetic field which would initiate the appearance of two elliptical vibrations having different frequencies. As a result, the laser would not oscillate on a single frequency and this would give rise to difficulties in control. At 6328 A, the creation of a high degree of anisotropy as exhibited by Brewster plates makes it possible on the contrary for the light vector to remain in the plane of incidence of said plates in respect of any value of the field H and all values of mismatch $\delta$ of the mode with respect to the center of the line.

Figure 7:
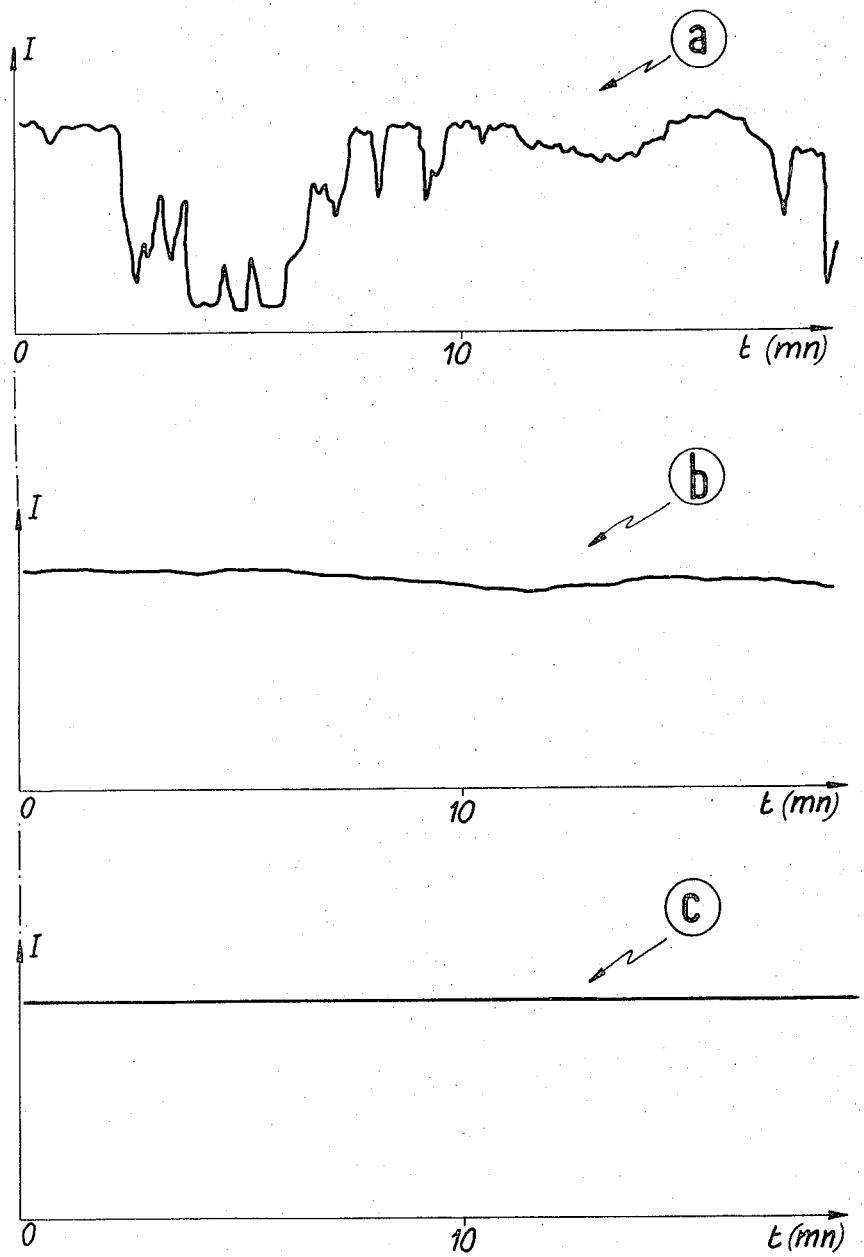
FIG. 7 is an illustration of the results obtained in stability of intensity.

By way of illustration of the results obtained by carrying out the method according to the invention, there have been shown in FIG. 7 the variations in output intensity of a laser as a function of time, in three different conditions. The time is plotted as abscissae, the unit being one minute. In FIG. 7a, there are shown the variations in luminous intensity I of a laser when the two frequency and intensity control loops are disconnected. This figure shows that the variations in the active and passive cavities are sufficient to nullify in a few minutes the intensity of a laser which has initially been set at its optimum value. FIG. 7b represents the variations in intensity of the same laser when the frequency control loop alone is in service; a distinct improvement in the intensity stability as a result of stabilization of the length $L_1$ is noted. However, there still remain slight fluctuations arising from variations in the length $L_2$ of the mode-selecting passive resonator, said length being not controlled in this case. There are shown in FIG. 7c the variations in intensity of the laser when both control loops are in service in accordance with the most complete alternative embodiment, thus simultaneously stabilizing the frequency and the intensity of the laser. The stability is excellent in this case.

It is therefore apparent from the foregoing description that the lasers in accordance with the invention have remarkable properties:

the radiation frequency is stabilized; the intensity can also be stabilized at the same time;

the frequency can be stabilized at any value within the range of amplification of the gaseous medium;

the method of frequency control allows the mode of oscillation to remain fixed and displaces only the amplification curve;

the method is applied to long lasers which emit high power;

the frequency is stabilized with respect to an atomic reference and not with respect to a mechanical reference.

We claim:

1. A method of frequency-stabilization of the radiation emitted by a high-power gas laser, wherein:

a mode selector is operated so as to select from all the longitudinal modes which are capable of oscillating only one of said modes which exhibits a frequency deviation $\delta$ from the center of the amplification line of the gaseous medium;

a first steady axial magnetic field is applied within the gaseous medium so as to cause splitting of the amplification line by Zeeman effect, the centers of each split line being located at a frequency $\Delta\nu$ from the center of the line in a zero field;

a second alternating axial magnetic field is applied and superimposed on said first steady magnetic field, which leaves the resonant frequencies at fixed values but modulates the position of the "magnetic Lamb dip" and consequently the output luminous intensity of said laser;

said modulated output intensity is detected;

the variations in said output intensity are compared with those of said second alternating magnetic field;

a correction signal is generated;

the frequency of the luminous emission of said laser is corrected by means of said correction signal in order to achieve the equality $\delta = \Delta\nu$, thereby holding the frequency of the selected mode at the center of one of the two split lines.

2. A method according to claim 1, wherein the intensity of the radiation emitted by the laser is also stabilized by producing action on the mode selector so as to control said intensity in dependence on a reference value.

3. A method according to claim 1, wherein the value of the radiation frequency is chosen by producing action on the value of said steady magnetic field and this acts on $\Delta\nu$.

4. A method according to claim 2, wherein the value of the radiation intensity is adjusted by producing action on said reference value.

5. A gas laser in which the radiation is frequency-stabilized and comprising an active gaseous medium contained in an envelope and located between a first and a second mirror forming a resonant cavity having a length $L_1$, means for exciting said gaseous medium so as to produce a population inversion, wherein said laser further comprises:

a longitudinal mode selector which permits oscillation of only one longitudinal mode;

means for producing in said active gaseous medium and adjustable steady axial magnetic field;

first means for holding the frequency of the selected mode at the center of one of the two magnetic Lamb dips constituted by a first control loop having a determined time constant and comprising means for producing in said active medium an adjustable alternating axial magnetic field, a first detector for the luminous intensity emitted by said laser, a first comparator for comparing the variations of said output intensity with those of said alternating magnetic field, said comparator being intended to generate a correction signal which produces action on means for varying the length $L_1$ of said resonant cavity.

6. A laser according to claim 5, wherein said laser further comprises second means for controlling the luminous intensity and having a determined time constant and producing action on said longitudinal mode selector, said time constant of said second means being longer than that of said first control means.

7. A laser according to claim 5, wherein said means for producing an adjustable steady axial magnetic field comprise a first solenoid surrounding said gaseous medium and supplied by an adjustable direct-current generator and wherein said means for producing an adjustable alternating axial magnetic field comprise a second solenoid which surrounds said gaseous medium, said second solenoid being coaxial with said first solenoid and supplied by an alternating current generator.

8. A laser according to claim 6, wherein said second means for controlling the luminous intensity are constituted by a second control loop which comprises a second detector for detecting the luminous intensity emitted by the laser, a second comparator to which is applied on the one hand the signal emitted by the detector and on the other hand a reference signal, said second comparator being intended to generate a correction signal for producing action on means which are capable of producing a variation in the frequency of the mode selected by said mode selector.

9. A laser according to claim 5, wherein said longitudinal mode selector is a resonator formed by two mirrors, one mirror being common with the second mirror of the resonant cavity having a length $L_1$, the other mirror of the selector being located outside the resonant cavity, and wherein said resonator has an optical length $L_2$ which is considerably smaller than $L_1$ and wherein said resonator is coupled to the resonant cavity by means of a beam divider, the assembly consisting of resonant cavity of length $L_1$ and resonator of length $L_2$ being such as to constitute a threemirror interferometer of the Fox-Smith type.

10. A laser according to claim 8, wherein said second detector for said second control loop detects the light emitted along the laser axis.

11. A laser according to claim 5, wherein said mode selector is a Fabry-Perot etalon placed in the resonant cavity of the laser at right angles to the axis of said cavity.

12. A laser according to claim 8, wherein said first luminous-intensity detector and said second luminousintensity detector are photoelectric detectors, said first and second comparators being such as to generate an electrical correction signal.

13. A laser according to claim 5, wherein the means adapted to produce a variation in the length $L_1$ of said resonant cavity are constituted by a piezoelectric ceramic element which is bonded to the first mirror of the resonant cavity.

14. A laser according to claim 9, wherein the mirror which forms the resonator of the mode selector and does not form part of the resonant cavity is bonded to a piezoelectric ceramic element which is capable of producing a variation in the length $L_2$ of the resonator.

15. A laser according to claim 11, wherein the modeselecting Fabry-Perot etalon is bonded to a piezoelectric ceramic element which is capable of varying the position of the etalon with respect to one of the mirrors of the resonant cavity.

16. A laser according to claim 9, wherein the resonator of length $L_2$ is fixed on a support having a low coefficient of expansion and especially of Invar.

17. A laser according to claim 16, wherein said resonator support is isolated from the means for producing said alternating magnetic field by a metallic wall having high magnetic permeability and especially of Mumetal.

18. A laser according to claim 6, wherein said first comparator of said first control loop is a phase detector.

19. A laser according to claim 10, wherein said second comparator of said second control loop is a differential amplifier, a signal which is porportional to the power emitted along the laser axis being applied to one input of said amplifier and a reference signal delivered by a voltage generator being applied to the other input of said amplifier.

20. A laser according to claim 5, wherein the active gaseous medium is a mixture of helium and neon and wherein the resonant cavity and the excitation are adapted so as to ensure that the laser operates on the transition of neon at 6328 A.

21. A laser according to claim 20, wherein the envelope containing the active gaseous medium is closed at both ends by transparent plates which are placed at the Brewster angle of incidence and produce a high value of anisotropy of the resonant cavity.

22. A laser according to claim 20, wherein the neon of the gaseous mixture is the isotope 20 of neon.

23. A laser according to claim 20, wherein said laser comprises within the resonant cavity a tank containing methane.

24. A laser according to claim 20, wherein said laser comprises within the resonant cavity a prism which is so oriented that said resonant cavity is adjusted at 6328 A.

* * * * *